(12) United States Patent
Zimmermann et al.

(10) Patent No.: US 9,982,671 B2
(45) Date of Patent: May 29, 2018

(54) VALVE OF A PISTON PUMP WITH A CLOSING BODY

(75) Inventors: Marc Zimmermann, Sonthofen (DE); Oliver Hennig, Obersulm (DE)

(73) Assignee: Robert Bosch GmbH, Stuttgart (DE)

( * ) Notice: Subject to any disclaimer, the term of this patent is extended or adjusted under 35 U.S.C. 154(b) by 890 days.

(21) Appl. No.: 13/817,549

(22) PCT Filed: Jun. 21, 2011

(86) PCT No.: PCT/EP2011/060340
§ 371 (c)(1),
(2), (4) Date: May 28, 2013

(87) PCT Pub. No.: WO2012/022522
PCT Pub. Date: Feb. 23, 2012

(65) Prior Publication Data
US 2013/0240773 A1    Sep. 19, 2013

(30) Foreign Application Priority Data
Aug. 19, 2010   (DE) .................. 10 2010 039 501

(51) Int. Cl.
| F04C 15/06 | (2006.01) |
| F16K 15/02 | (2006.01) |
| B60T 8/40 | (2006.01) |
| F16K 25/00 | (2006.01) |
| F04B 53/10 | (2006.01) |

(52) U.S. Cl.
CPC .......... *F04C 15/064* (2013.01); *B60T 8/4031* (2013.01); *F04B 53/108* (2013.01); *F04B 53/1017* (2013.01); *F16K 15/026* (2013.01); *F04B 53/10* (2013.01); *F04C 15/06* (2013.01); *F16K 25/00* (2013.01)

(58) Field of Classification Search
CPC ..................................................... F04C 15/064
USPC ......................................................... 137/535
See application file for complete search history.

(56) References Cited

U.S. PATENT DOCUMENTS

| 1,939,128 | A | 12/1933 | Meyer |
| 3,332,437 | A | 7/1967 | Hallen |
| 6,171,083 | B1 * | 1/2001 | Schuller .................. 417/549 |
| 2004/0234400 | A1 * | 11/2004 | Schepp et al. ............... 417/471 |
| 2010/0132816 | A1 * | 6/2010 | Holzle et al. ................ 137/535 |

(Continued)

FOREIGN PATENT DOCUMENTS

| DE | 199 28 913 A1 | 1/2001 |
| EP | 0 309 240 A2 | 3/1989 |
| JP | 56-35622 Y2 | 10/1977 |

(Continued)

OTHER PUBLICATIONS

International Search Report corresponding to PCT Application No. PCT/EP2011/060340, dated Sep. 28, 2011 (German and English language document) (5 pages).

*Primary Examiner* — John K Fristoe, Jr.
*Assistant Examiner* — Christopher Ballman
(74) *Attorney, Agent, or Firm* — Maginot, Moore & Beck LLP

(57) ABSTRACT

A valve of a piston pump, in particular for a hydraulic vehicle brake system, includes a closing body configured to be moved in an axially guided manner against a sealing seat. The closing body is formed in two pieces, which include a damping piston and a closing element inserted in the damping piston.

7 Claims, 3 Drawing Sheets

(56) References Cited

U.S. PATENT DOCUMENTS

2010/0266427 A1* 10/2010 Haecker et al. .............. 417/273
2011/0099995 A1* 5/2011 Schuller .......................... 60/591

FOREIGN PATENT DOCUMENTS

JP          57-149358 U    9/1982
KR          2001-0032017 A  4/2001

* cited by examiner

VALVE OF A PISTON PUMP WITH A CLOSING BODY

This application is a 35 U.S.C. § 371 National Stage Application of PCT/EP2011/060340, filed on Jun. 21, 2011, which claims the benefit of priority to Serial No. DE 10 2010 039 501.3, filed on Aug. 19, 2010 in Germany, the disclosures of which are incorporated herein by reference in their entirety.

BACKGROUND

The disclosure concerns a valve of a piston pump, in particular for a hydraulic vehicle brake system, with a closing body which can be moved in an axially guided manner against a sealing seat.

DE 199 28 913 A1 discloses a piston pump in which a single pump element or pump unit is formed in a pump housing by a pump piston which is mounted displaceably in a pump cylinder. The pump piston draws brake fluid into the pump cylinder and expels it from the pump cylinder through a valve.

One object of the present disclosure is to create a valve of a piston pump which is economic to produce and install but nonetheless has particularly good opening and closing behavior.

SUMMARY

According to the disclosure a valve of a piston pump is created, in particular for a hydraulic vehicle brake system, with a closing body which can be moved in an axially guided manner against a sealing seat. The closing body is formed in two pieces with a damping piston and a closing element inserted therein.

The two-piece closing body gives a construction which is particularly favorable for installation and furthermore is extremely suitable for compensating for production dimension tolerances and for achieving the required sealing throughout its service life. The disclosure comprises a favorable installation sequence of components to be installed, which can be achieved with a high degree of automation with a mobile workpiece carrier. The valve according to the disclosure is therefore simple to produce but nonetheless has a very positive influence on the main functions of the associated pump unit. The two-piece design of the closing body also creates conditions which are particularly advantageous for the function of the valve, as will be explained in more detail below.

The closing element is preferably formed with a head lying on an end of the damping piston and a shaft inserted in the damping piston. The head is preferably formed dome-shaped and/or the shaft cylindrical.

The resulting mushroom-shaped closing element with its shaft to be inserted in the damping piston can be mounted with a high degree of automation; in particular on a mobile workpiece carrier.

A central depression is formed in the closing element, in particular in its head, preferably on the end facing the sealing seat.

The central depression forms a concave region on the end of the closing element facing the fluid flowing into the valve. This concave region generates a build-up effect for the inflowing fluid and leads to a particularly good opening behavior of the valve.

The closing element is preferably retained on the damping piston by means of a catch, in particular in the form of at least one catch formed on the shaft.

This shaft can be mounted and fixed on the damping piston by simple push-fit or insertion and catching or engagement. The at least one catch is preferably formed as a shoulder, clip or stud.

The closing element is furthermore advantageously held on the damping piston with radial play which is created in particular by a radial spacing of the shaft from the surrounding damping piston.

In this refinement in particular the diameter of the then circular cylindrical shaft is formed slightly smaller than the diameter of an opening, also circular cylindrical, formed in the damping piston to receive and retain the shaft. The radial play thus provided allows the closing element to move slightly radially in the damping piston and thus in particular slide with its head along the end of the damping piston. This radial movement means that the closing element can lie on the associated valve seat over the full surface without an undesirable offset of the closing element relative to the valve seat being able to arise.

On the end of the damping piston facing towards the closing element is preferably formed at least one channel through which an underflow, directed radially from outside to inside, of the closing element is possible.

Through the channel, fluid which has entered the damping piston through the opening in the valve seat can reach the back of the head and also the rear of the damping piston. This fluid can be used for damping the movement of the damping piston in a targeted manner.

The channel preferably forms a segment of a flow connection through the damping piston to its other end.

After the said channel in the flow direction, the remaining flow connection is advantageously formed by means of a central passage opening in the damping piston, in which opening the mushroom-shaped closing element is then also inserted with play by means of its shaft.

Advantageously in the channel a constriction is formed which forms a choke.

The choke allows the outflow of fluid into the interior of the damping piston and to its rear to be braked or backed up in a targeted manner. In this way, a greater damping effect of the damping piston can be achieved in a targeted manner in relation to a lower vibration behavior of the associated closing element.

The channel is preferably formed by means of a radially oriented groove formed in the damping piston, the opening cross section of which groove is reduced in the axial direction at one point.

This design of the channel with associated choke can be produced particularly economically by a simple milling process.

The disclosure furthermore concerns a piston pump of a vehicle brake system with such a valve according to the disclosure.

BRIEF DESCRIPTION OF THE DRAWINGS

An embodiment example of the solution according to the disclosure is explained in more detail below with reference to the enclosed schematic drawings, in which.

DETAILED DESCRIPTION

Figure 1:
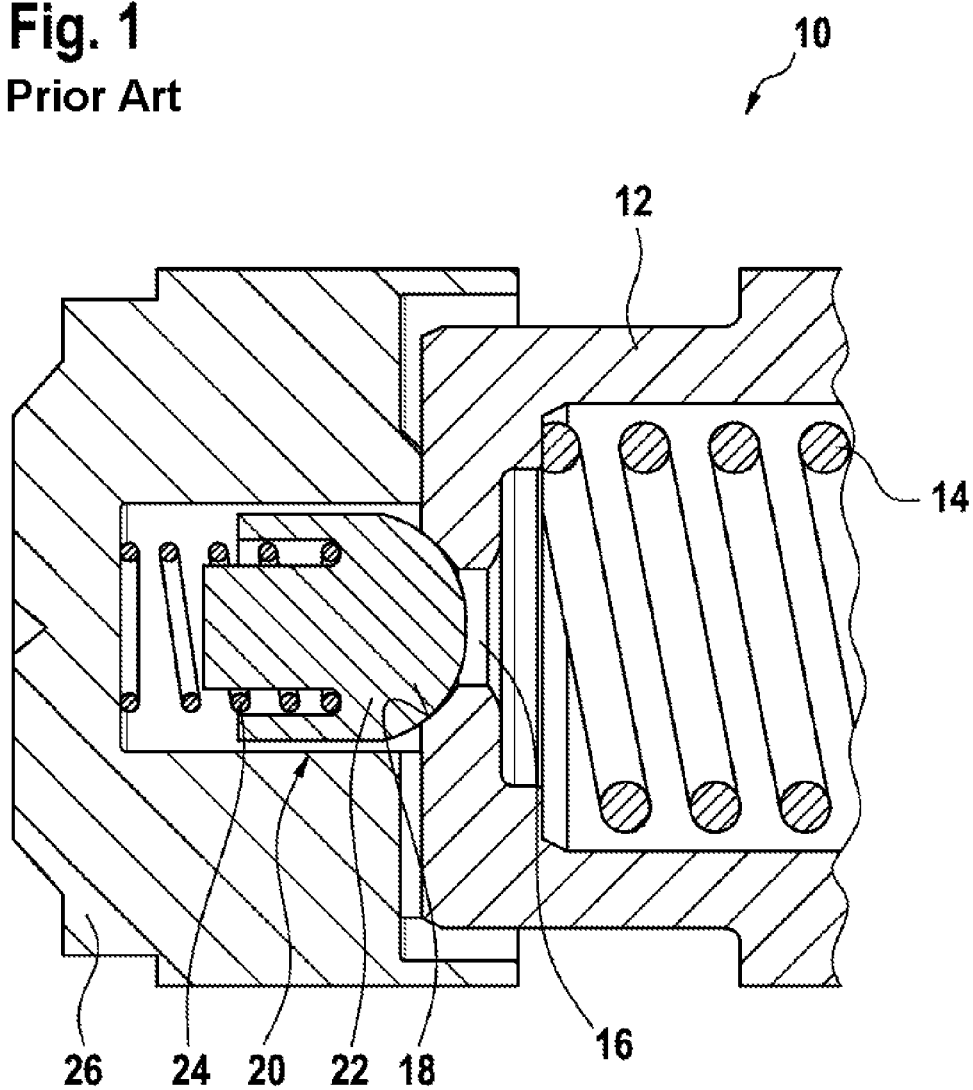
FIG. 1 shows a partial longitudinal section of a piston pump according to the prior art.

FIG. 1 shows a piston pump 10 according to the prior art for a hydraulic vehicle brake system (not shown further) which serves to generate a fluid pressure of brake fluid within the vehicle brake system. The piston pump 10 for this comprises a beaker-shaped cylinder 12 in which a piston (not shown) is mounted displaceably against a coil spring 14. The piston delivers brake fluid through a circular outflow opening 16 formed in the base region of the cylinder 12. The outflow opening 16 is surrounded by a valve seat or sealing seat 18 which is part of an outlet valve 20. The outlet valve 20 furthermore comprises a one-piece dome-like closing body 22, which is pressed by means of a coil spring 24 against the sealing seat 18. The coil spring 24 is supported on a pump cover 26 which surrounds the cylinder 12 on its end.

Figure 2:
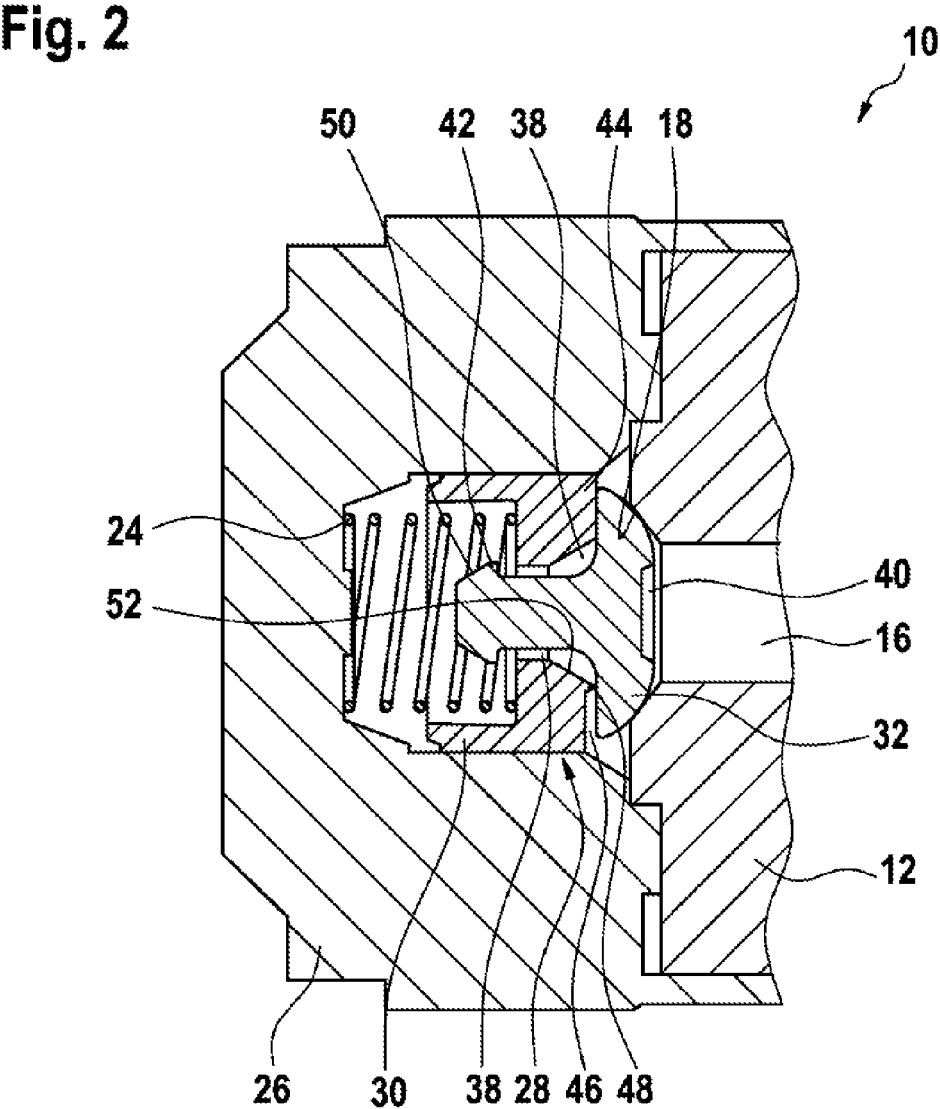
FIG. 2 shows the view according to FIG. 1 of a first embodiment example of a piston pump according to the disclosure with an associated closing body.
Figure 3:
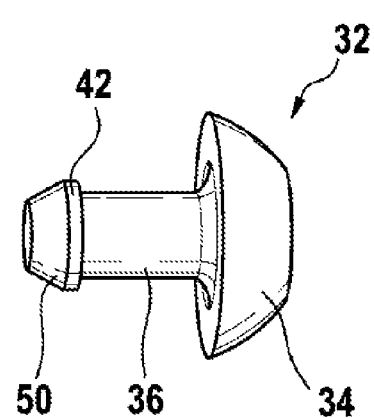
FIG. 3 shows a perspective view of the closing body according to FIG. 2.

FIGS. 2 and 3 show a first embodiment example of a piston pump 10 according to the disclosure in which the outlet valve 20 is formed with a two-piece closing body 28. The closing body 28 comprises a damping piston 30 and a mushroom-shaped closing element 32 inserted therein.

Thus a construction is created with which production dimension tolerances, in particular between the sealing seat 18 and the closing body 28, can be compensated in the radial direction. The closing element 32 with its shaft-side end lies on the face of the damping piston 30 and is radially slightly mobile. The closing element 32 comprises a head 34 lying in such a way and also and a shaft 36 inserted into and protruding into the damping piston 30.

The closing element 32 with its shaft 36 has been inserted in a central passage opening 38 formed in the damping piston 30, and has a central depression 40 at its head 34 on the end facing towards the sealing seat 18. This central depression 40 creates a build-up effect for the inflowing fluid and leads to an improved opening behavior of the outlet valve 20.

The closing element 32 is retained on the damping piston 30 by means of a catch, which in the embodiment example shown in FIGS. 2 and 3 is formed by a peripheral shoulder 42 formed on the free end of the shaft 36. The diameter of the shoulder 42 is slightly greater than the diameter of the passage opening 38. The remaining shaft 36 has a slightly smaller diameter than the passage opening 38. The closing element 32 is thus held on the damping piston 30 with radial play, which in particular is guaranteed by the radial spacing of the shaft 36 from the surrounding damping piston 30.

On the end 44 of the damping piston 30 facing the closing element 32 is formed a radially oriented channel 46 through which fluid can flow below the head 34 into the interior of the damping piston 30 and to its rear. This fluid contributes to a damping of the movement of the damping piston 30 which can be adjusted in a targeted manner for different operating pressures. The damping piston 30 is here also spring-pretensioned at its rear by means of a coil spring 24 which rests on a pump cover 26.

In the channel 46 is formed a constriction 48 which forms a choke. This choke brakes the outflow of fluid into the interior of the damping piston 30 in a targeted manner.

To insert the closing element 32 by means of its shaft 36 in the passage opening 38, a chamfer 50 and 52 is formed both on the free end of the shaft 36 and on the face edge of the passage opening 38.

Figure 4:
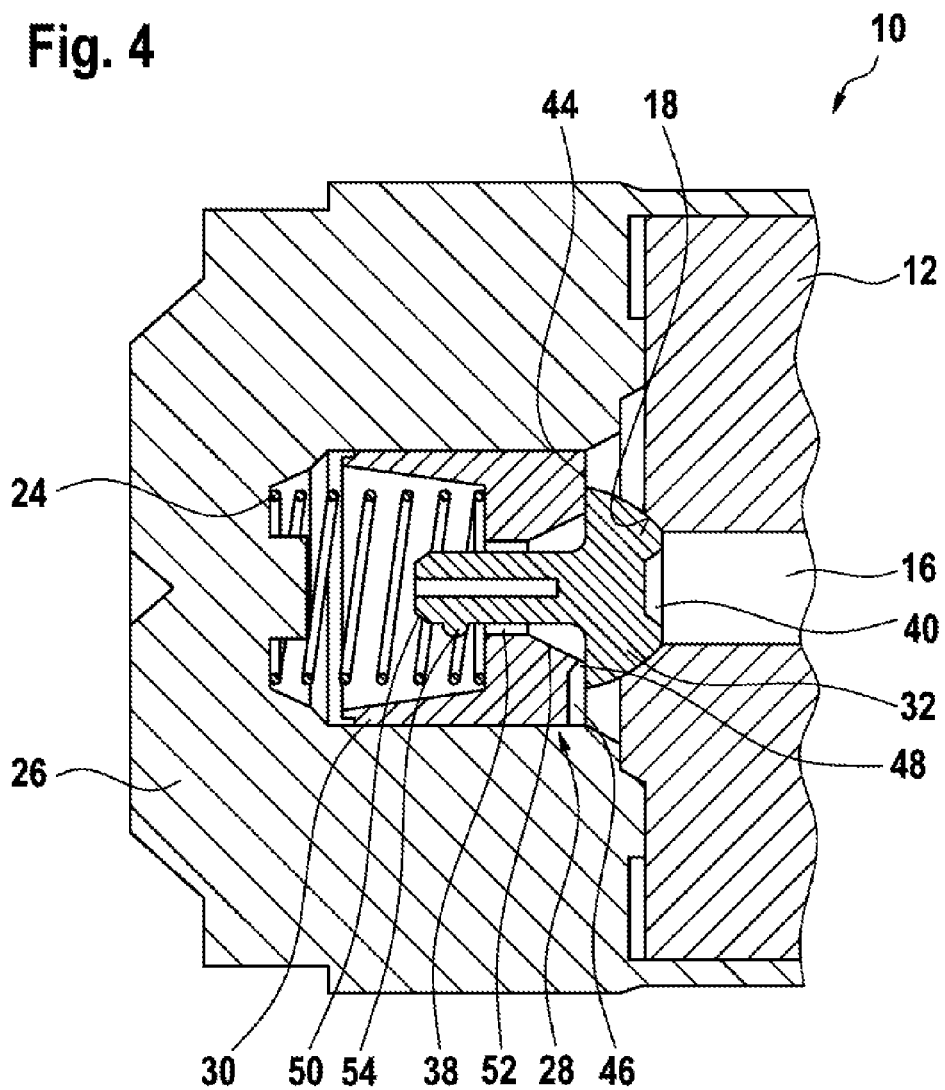
FIG. 4 shows the view according to FIG. 1 of a second embodiment example of a piston pump according to the disclosure with an associated closing body.
Figure 5:
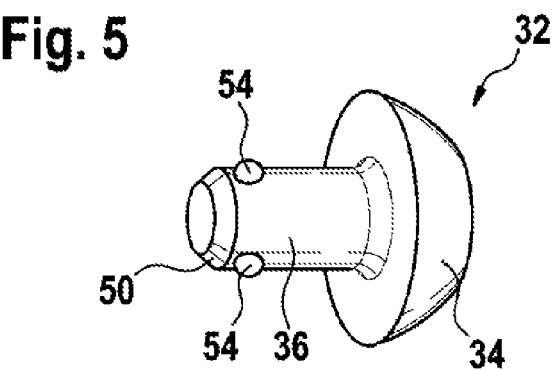
FIG. 5 shows a perspective view of the closing body according to FIG. 4.

FIGS. 4 and 5 show an embodiment example of a two-piece closing body 28 according to the disclosure in which the catch between the damping piston 30 and the mushroom-shaped closing element 32 is produced by means of studs 54. The studs 54 are distributed over the periphery of the associated shaft 36 at regular intervals where the shoulder 42 is formed in the embodiment example according to FIGS. 2 and 3.

The invention claimed is:

1. A valve of a piston pump, comprising:
a sealing seat; and
a closing body configured to be moved in an axially guided manner against the sealing seat, wherein the closing body is formed in two pieces, the pieces including a damping piston and a closing element inserted therein,
wherein the closing element is held on the damping piston such that the closing element is radially translatable within a radial spacing formed between a shaft of the closing element and the damping piston;
wherein, on the an end of the damping piston facing towards the closing element, at least one channel is formed through which an underflow, directed radially from outside to inside, of the closing element is possible; and
wherein the at least one channel forms a segment of a flow connection through the damping piston to its other end.

2. A valve of a piston pump, comprising:
a sealing seat; and
a closing body configured to be moved in an axially guided manner against the sealing seat, the closing body formed in two pieces, including:
a damping piston having a first end and a second end arranged opposite the first end; and
a closing element inserted within the damping piston, wherein the damping piston includes a flow passage through the first end and the second end,
wherein the damping piston includes at least one channel through which an underflow, directed radially from outside to inside, of the closing element is possible, and
wherein the flow passage is in fluid communication with the at least one channel.

3. The valve as claimed in claim 2, wherein:
the at least one channel is formed on the first end of the damping piston.

4. The valve as claimed in claim 3, wherein the at least one channel forms a segment of the flow passage.

5. The valve as claimed in claim 3, wherein a constriction is formed in the at least one channel, the constriction forming a choke.

6. The valve as claimed in claim 5, wherein:
the at least one channel is formed by a radially oriented groove formed in the damping piston, and
an opening cross section of the groove is reduced in an axial direction at one point.

7. A piston pump of a vehicle brake system, comprising:
a valve including:
a sealing seat; and
a closing body configured to be moved in an axially guided manner against the sealing seat, wherein the closing body is formed in two pieces, the pieces including a damping piston and a closing element inserted therein, wherein the closing element is held on the damping piston such that the closing element is radially translatable within a radial spacing formed between a shaft of the closing element and the damping piston;

wherein:

at least one channel is formed on an end of the damping piston facing towards the closing element, and an underflow, directed radially from outside to inside, of the closing element is possible through the at least one channel; and wherein the at least one channel forms a segment of a flow connection through the damping piston to its other end.

\* \* \* \* \*